UNITED STATES PATENT OFFICE.

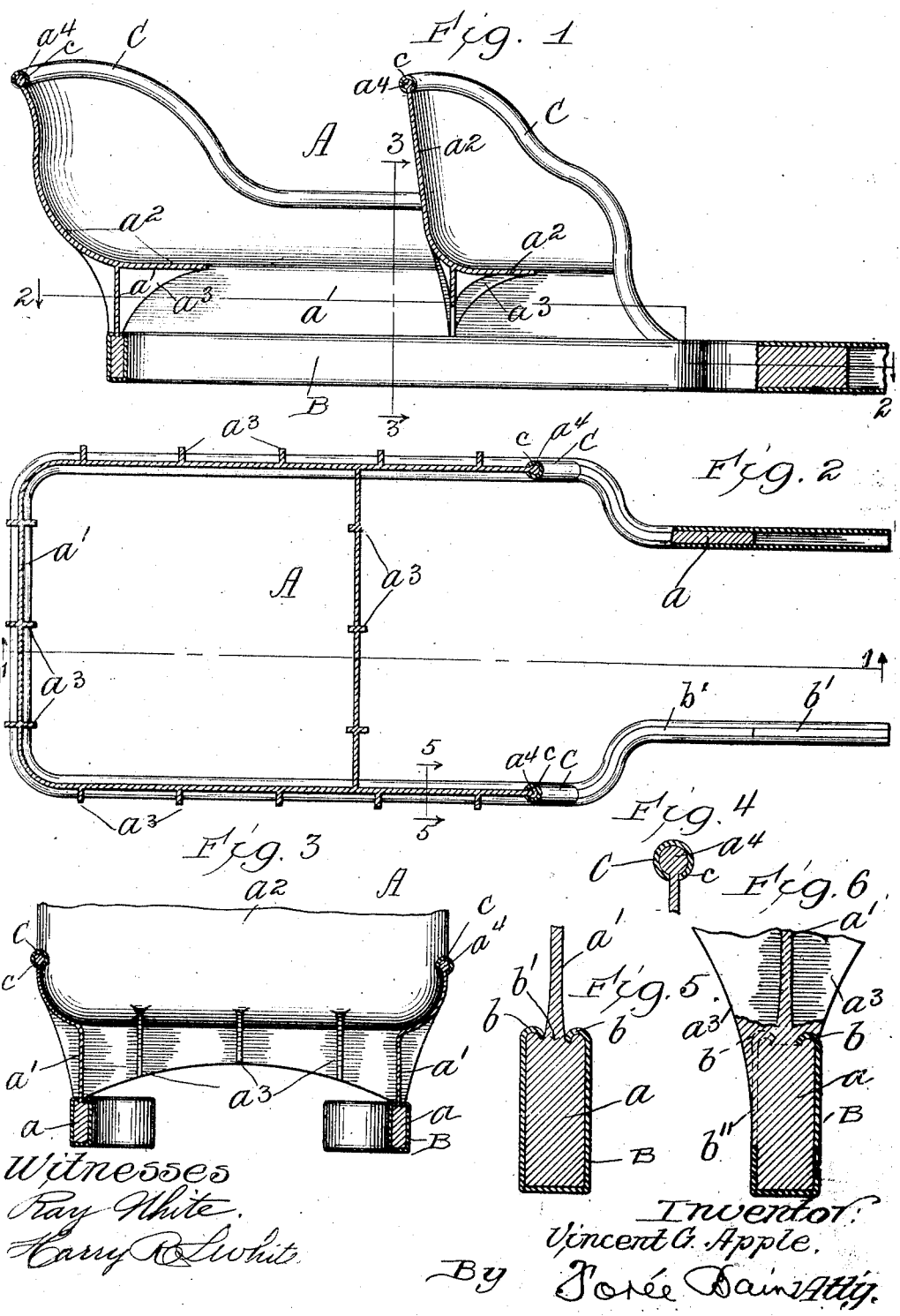

VINCENT G. APPLE, OF DAYTON, OHIO.

VEHICLE BODY AND FRAME.

No. 868,749.

Specification of Letters Patent.

Patented Oct. 22, 1907.

Application filed September 12, 1904. Serial No. 224,195.

*To all whom it may concern:*

Be it known that I, VINCENT G. APPLE, of Dayton, in the county of Montgomery and State of Ohio, have invented certain new and useful Improvements in Vehicle Bodies and Frames; and I hereby declare that the following is a full, clear, and exact description thereof, reference being had to the accompanying drawings, which form part of this specification.

My invention has for its primary object to provide an improved vehicle body which will be light, strong, and durable, and my invention further has in view to provide a combination vehicle body and frame, of which the members are inseparably associated and which will be particularly adapted for automobile purposes.

In the drawings, in all the figures whereof like numerals of reference indicate like parts; Figure 1 is a longitudinal vertical section of an automobile body, constructed in accordance with my invention, taken on line 1—1 of Fig. 2. Fig. 2 is a section on line 2—2 of Fig. 1. Fig. 3 is a section on line 3—3 of Fig. 1. Figs. 4 and 5 are details enlarged of top and bottom edges of the body and frame, as illustrated in Fig. 1. Fig. 6 is an enlarged detail.

My improved vehicle body is made of metal, preferably aluminium, cast in a single piece, preferably under high pressure. The edges of the body are reinforced, preferably with a harder metal, such as steel, the edges, to this end, being preferably clad with a steel covering. The reinforcing part of the lower edge is preferably of appropriate dimensions and shape to form the frame of the vehicle, and the frame is preferably so intimately united with the softer metal of the body during the operation of casting the latter that their connection is inseparable.

Referring now specifically to the construction shown in the drawings, A indicates generally the vehicle body, illustrated as an automobile tonneau, which obviously may be of any suitable shape for any use to which it may be put.

B indicates the frame-member, which also constitutes a reinforcing part for the lower edge of the body. The frame member B is preferably composed of a hollow steel structure, closed, or substantially closed, on three sides, and at its top having its edges turned inward and downward as at $b$—$b$ to leave therebetween an opening $b'$, preferably uninterrupted throughout the length of the frame member. In the formation of the combined body and frame this hollow frame member is filled with material of which the body is composed during the casting of the body, so that there is formed therein a base $a$ corresponding in shape with the interior of the frame member, and integrally connected with the upwardly extending web $a'$ which together with the properly shaped upper portion $a^2$ and suitable strengthening ribs $a^3$ constitute the body portion A. As shown in Fig. 6 such ribs $a^3$ as extend down to the frame member $b$ may either rest thereon as shown to the right in Fig. 1, or may be bonded, through suitable slots $b''$ made in the member B with the interior aluminium base $a$ as shown at the left of Fig. 6.

It will be apparent that the intimate association of the body base $a$ and the frame member B is advantageous to both the body and frame structure, as the filling of soft metal within the frame member B makes the latter exceedingly strong, and enables a relatively light frame structure to strongly resist fracture, while the lower edge or base of the body structure, being clad with the steel of the frame, is protected against damage by blows and is adapted for the reception of bolts and like connections for securing thereto the appurtenant parts of the vehicle when completed. It will also be apparent that the frame may be made of sheet metal and the construction thereby cheapened.

At its upper edge the superstructure $a^2$ of the vehicle body is preferably also clad with sheet metal, the body being provided with a head $a^4$ filling a properly shaped tubular reinforcing member C open as at $c$ along its lower edge.

In constructing a vehicle body as above specifically described the frame member B is placed in the bottom of a suitable mold and the properly shaped reinforcing structure C placed in the top thereof, each of said hard metal members having its open edge toward the interior of the mold. Now the aluminium in a molten condition is cast in the mold under high pressure, bodies thereof being forced into the hollow reinforcing members and thereby intimately and inseparably connected therewith, such masses of aluminium being integral parts of the said body structure.

While I prefer that the reinforcing members at the edges of the body should be hollow and surround masses of the softer body-material, it will be apparent that the reinforcing structures might be surrounded by the body material with some of the advantages incident to the present form, and while I prefer that the reinforcing member for the lower edge of the body shall constitute the frame member, it will also be apparent that reinforcement might be employed independently of the frame, and the frame separably connected with the body. Further, while I prefer that all parts of the body which in the complete structure are fixed in relation to each other, shall be cast in one piece, it will be apparent that the seats and other parts might be separately made without departure from the spirit of my invention, and that a plural-piece construction might readily be made embodying some of the advantages of my invention without departing from the teachings thereof.

It will also be apparent that other slight changes might be made in the specific embodiment of my invention, and I do not desire to be understood as limiting myself to the specific construction herein shown and described further than as specified in the claims.

Having described my invention, what I claim and desire to secure by Letters Patent, of the United States, is:—

1. As an article or manufacture, a cast aluminium vehicle body having edges reinforced of a harder metal inseparably connected therewith in casting.

2. As an article of manufacture, a cast aluminium vehicle body having its edges clad with hollow reinforcing members of a harder metal inseparably connected with the aluminium during the casting operation.

3. As an article of manufacture, a passenger vehicle structure comprising a frame of hard metal for supporting a vehicle body, and a body composed of metal, cast in inseparable relation with and in superposed relation on the preëxistent frame, to form therewith a unit.

4. As an article of manufacture, a structure comprising a steel frame for supporting a vehicle body, and an aluminium body, cast in inseparable association with and in superposed relation on the frame, to form therewith a unit.

5. As an article of manufacture, a unitary vehicle body and frame, consisting of a hollow frame member having an opening therein and an aluminium body integrally cast with a base portion filling the frame and bonding with the upper portion of the body through the opening in the frame.

6. As an article of manufacture, a vehicle structure comprising a hollow metal frame having an opening along its upper side and body of aluminium cast under pressure filling said hollow frame and projecting from said opening, the projecting portion of the aluminium being shaped to constitute a vehicle body.

7. As an article of manufacture, a vehicle structure comprising two hollow reinforcing members shaped to conform with the opposite edges of a vehicle body, said reinforcing members having openings along their confronting sides, and a body of aluminium cast under pressure filling said hollow reinforcing members and projecting through the opening to integrally bond with the uncovered portion of the body.

8. As an article of manufacture, a vehicle structure comprising a hollow reinforcing member shaped to conform with one edge of an automobile body and having an opening therein, and a metal body integrally cast with a portion filling the reinforcing member and bonding with the remaining portion of the body through the opening therein.

9. As an article of manufacture, a vehicle structure comprising reinforcing parts of hard metal shaped to conform with the opposite edges of a vehicle body and having apertures therein, and a body of aluminium cast in permanent inseparable association with the reinforcing parts and bonding therewith through the apertures therein.

10. As an article of manufacture, a vehicle body comprising a reinforcing structure, shaped to conform with one edge of the body and having an opening therein, and a metal body cast with a portion extending through the opening in the reinforcing structure to effect a permanent union between said body and the reinforcing structure.

In testimony that I claim the foregoing as my own, I affix my signature in presence of two witnesses.

VINCENT G. APPLE.

In presence of—
L. M. ARNOLD,
N. H. KELLEHER.